US007840552B2

(12) United States Patent
Beavin et al.

(10) Patent No.: US 7,840,552 B2
(45) Date of Patent: *Nov. 23, 2010

(54) COST-BASED SUBQUERY CORRELATION AND DECORRELATION

(75) Inventors: Thomas Abel Beavin, Milpitas, CA (US); Mengchu Cai, San Jose, CA (US); Yao-Ching Stephen Chen, Saratoga, CA (US); Hsiuying Yen Cheng, Fremont, CA (US); Fen-Ling Lin, San Jose, CA (US); Irene Ching-Hua Liu, San Jose, CA (US); Jerry Mukai, San Jose, CA (US); Demai Ni, Davis, CA (US); Yoichi Tsuji, San Jose, CA (US); Li Xia, San Jose, CA (US); Ying Zeng, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/104,379

(22) Filed: Apr. 16, 2008

(65) Prior Publication Data

US 2008/0215534 A1    Sep. 4, 2008

Related U.S. Application Data

(63) Continuation of application No. 11/156,500, filed on Jun. 17, 2005, now Pat. No. 7,376,646.

(51) Int. Cl.
*G06F 17/30*    (2006.01)
(52) U.S. Cl. .................. 707/713; 707/714; 707/999.003
(58) Field of Classification Search ........................ None
See application file for complete search history.

(56) References Cited

U.S. PATENT DOCUMENTS

| 5,276,870 | A |   | 1/1994 | Shan et al. |
| 5,367,675 | A |   | 11/1994 | Cheng et al. |
| 5,548,755 | A | * | 8/1996 | Leung et al. .................. 707/2 |
| 5,551,031 | A |   | 8/1996 | Cheng et al. |
| 5,557,791 | A |   | 9/1996 | Cheng et al. |
| 5,724,570 | A |   | 3/1998 | Zeller et al. |
| 5,761,657 | A |   | 6/1998 | Hoang |
| 5,822,750 | A |   | 10/1998 | Jou et al. |
| 6,032,143 | A |   | 2/2000 | Leung et al. |
| 6,061,676 | A |   | 5/2000 | Srivastava et al. |

(Continued)

OTHER PUBLICATIONS

Chaudhuri, S., and K. Shim, "Optimization of Queries with User-Defined Predicates", ACM Transactions on Database Systems, vol. 24, No. 2, Jun. 1999, pp. 177-228.

(Continued)

*Primary Examiner*—Neveen Abel Jalil
*Assistant Examiner*—Jacques Veillard
(74) *Attorney, Agent, or Firm*—Janaki K. Davda; Konrad Raynes & Victor LLP (57) ABSTRACT

Techniques are provided that determine that a query includes at least one subquery that may be correlated or decorrelated. An internal representation of the query that represents the subquery in both correlated and decorrelated form is generated, wherein the internal representation includes at least one virtual table.

16 Claims, 5 Drawing Sheets

U.S. PATENT DOCUMENTS

| | | | |
|---|---|---|---|
| 6,226,637 B1 | 5/2001 | Carey et al. | |
| 6,341,281 B1 | 1/2002 | MacNicol et al. | |
| 6,411,951 B1 | 6/2002 | Galindo-Legaria et al. | |
| 6,529,896 B1 | 3/2003 | Leung et al. | |
| 6,662,175 B1 | 12/2003 | Ghazal et al. | |
| 6,728,694 B1 | 4/2004 | Ramasamy et al. | |
| 7,167,853 B2* | 1/2007 | Zaharioudakis et al. | 707/999.002 |
| 7,177,856 B1* | 2/2007 | Mancuso | 707/999.003 |
| 7,181,446 B2* | 2/2007 | Bossman et al. | 707/714 |
| 7,376,646 B2* | 5/2008 | Beavin et al. | 707/999.003 |
| 7,617,179 B2* | 11/2009 | Nica | 707/999.002 |
| 2001/0049685 A1* | 12/2001 | Carey et al. | 707/103 R |
| 2003/0088558 A1 | 5/2003 | Zaharioudakis et al. | |
| 2004/0153448 A1 | 8/2004 | Cheng et al. | |
| 2004/0220911 A1 | 11/2004 | Zuzarte et al. | |
| 2004/0220923 A1* | 11/2004 | Nica | 707/3 |
| 2005/0165751 A1* | 7/2005 | Bossman et al. | 707/3 |

OTHER PUBLICATIONS

Ganski, R.A., and H.K.T. Wong, "Optimization of Nested SQL Queries Revisited", ACM SIGMOD Record, vol. 16, Iss. 3, 1987, pp. 23-33.

* cited by examiner

COST-BASED SUBQUERY CORRELATION AND DECORRELATION

CROSS-REFERENCE TO RELATED APPLICATIONS

This application is a continuation of and claims the benefit of "COST-BASED SUBQUERY CORRELATION AND DECORRELATION", having application Ser. No. 11/156,500, filed Jun. 17, 2005, the entire contents of which is incorporated herein by reference.

BACKGROUND

1. Field

Embodiments of the invention relate to cost-based subquery correlation and decorrelation.

2. Description of the Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

A query may be described as a request for information from a database based on specific conditions. A query may contain a subquery. If the query is a first (or "outer") SELECT statement, the subquery may be described as a second (or "inner") SELECT statement within a WHERE or HAVING clause of the first select statement. The subquery typically includes a search condition that refers to a value or set of values needed for the first query to be answered.

In conventional systems, a query optimization phase is separated into two stages: a "query rewrite" stage and a "query optimization" stage. The query rewrite stage performs semantic checking and query transformations. That is, the query may be rewritten ("transformed") during the query rewrite stage. The query optimization stage takes the transformed query and chooses an efficient access path based on how the query was transformed. An access path may be described as the technique that is selected for retrieving data from a specific table. For example, an access path can involve the use of an index, a sequential scan, or a combination of the two. Thus, execution of the query may be optimized during the query optimization phase of processing.

A subquery correlation may be described as a subquery that contains a correlated reference to a column of a table that is outside the subquery. For example, a subquery correlation may include a subquery that is part of a WHERE or HAVING clause that is applied to a row or group of rows of a table or view that is named in an outer subselect statement. Correlation may be described as adding a correlated predicate to a subquery, and decorrelation may be described as removing a correlated predicate from the subquery.

Some transformations, such as subquery correlation and decorrelation do not always result in a more efficient access path and may cause performance degradation. The transformation that provides the most efficient access path is not known until after the query optimization stage, but the query transformation occurs before the optimization. Thus, at query rewrite time, the best transformation is not known.

For example in query (1), the correlated subquery should be decorrelated:

SELECT * FROM BIG_TABLE A WHERE   (1)
   EXISTS (SELECT 1 FROM SMALL_TABLE B
   WHERE B.COL = A.COL)

In query (1), the SELECT 1 statement is a subquery. Also, the condition B.COL =A.COL refers to table A, which is in the outer select, and this reference is an example of a correlated subquery. For this example, it is assumed that BIG_TABLE is very large, SMALL_TABLE is very small, and a unique index is available on BIG_TABLE.COL. The access path for query (1), as written, would be to scan BIG_TABLE and probe SMALL_TABLE for every row of BIG_TABLE. This, however, requires more processing than query (2), which results from transforming query (1) during a query rewrite stage.

SELECT * FROM BIG_TABLE A WHERE   (2)
   A.COL IN (SELECT B.COL FROM SMALL_TABLE B)

In transformed query (2), the subquery has been decorrelated, allowing SMALL_TABLE to be accessed first and then joined to BIG_TABLE (after duplicates are removed from SMALL_TABLE) using the unique index on BIG_TABLE. In this example, decorrelating the subquery resulted in better performance.

However, if the same tables were switched, then decorrelating the subquery would cause performance to degrade. Query (3) provides an example of switching the tables:

SELECT * FROM SMALL_TABLE B   (3)
   WHERE EXISTS (SELECT 1 FROM BIG_TABLE A
   WHERE A.COL = B.COL)

In query (3), the subquery (i.e., the SELECT 1 statement) should not be decorrelated to remove the reference to B.COL. However, the only way to know whether performance would be better with a correlated or decorrelated subquery would be to determine a cost for each subquery and compare the costs. This means that in the query rewrite stage, the query is rewritten in correlated form and in decorrelated form. Then, the query optimization stage is invoked for each version of the rewritten query. For a query that contains a single subquery, this effectively doubles the amount of optimization processing needed to optimize the query. For queries that contain multiple subqueries, optimization processing may increase exponentially.

Therefore, there is a need in the art for improved query rewrite and optimization.

SUMMARY OF THE INVENTION

Provided are a method, article of manufacture, and system that determine that a query includes at least one subquery that may be correlated or decorrelated. An internal representation of the query that represents the subquery in both correlated and decorrelated form is generated, wherein the internal representation includes at least one virtual table.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the invention.

Figure 1:
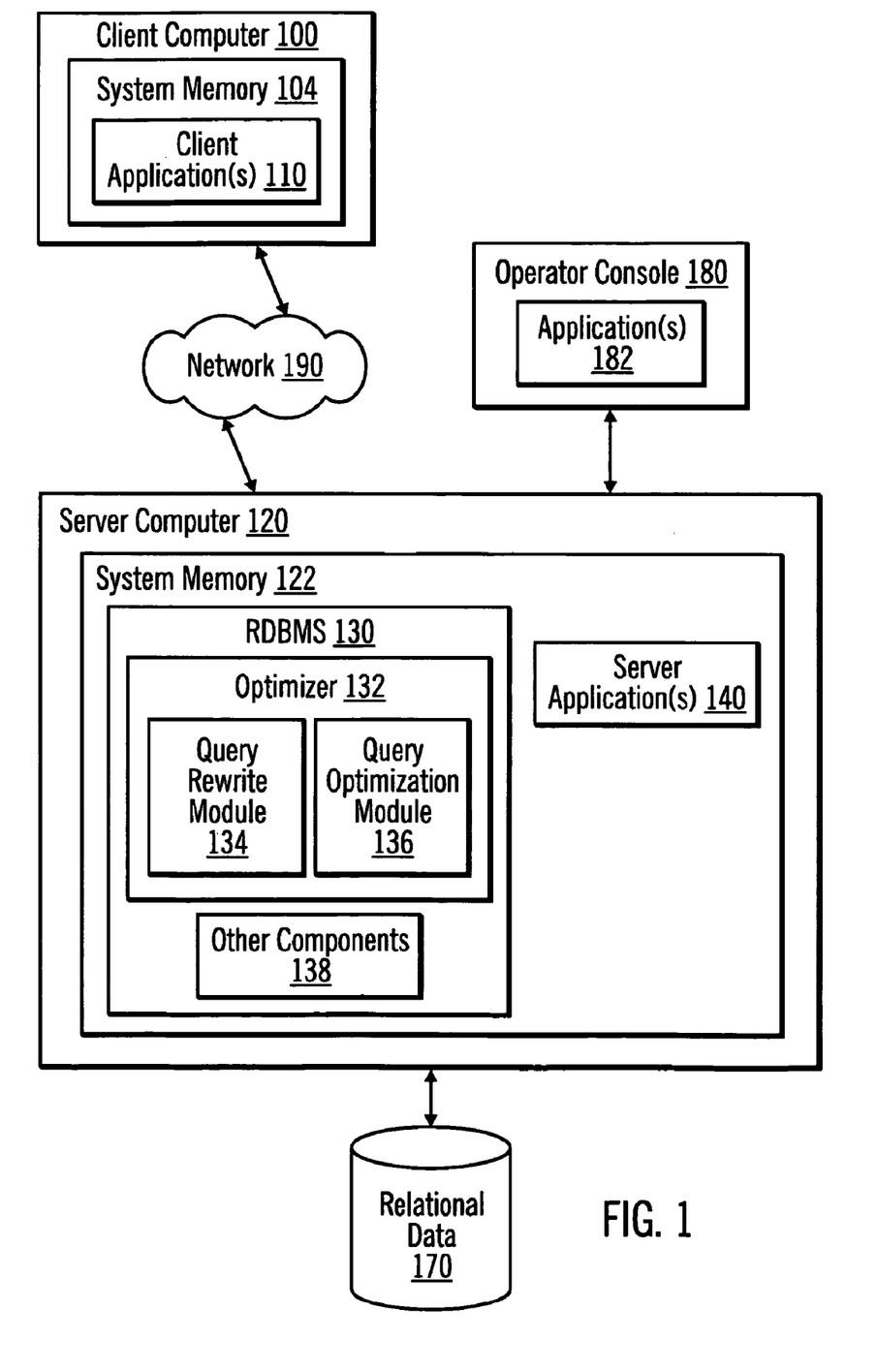
FIG. 1 illustrates, in a block diagram, a computing environment in accordance with certain embodiments of the invention.

FIG. 1 illustrates, in a block diagram, a computing environment in accordance with certain embodiments of the invention. A client computer 100 is connected via a network 190 to a server computer 120. The client computer 100 includes system memory 104, which may be implemented in volatile and/or non-volatile devices. One or more client applications 110 (i.e., computer programs) are stored in the system memory 104 for execution by a processor (e.g., a Central Processing Unit (CPU)) (not shown).

The server computer 120 includes system memory 122, which may be implemented in volatile and/or non-volatile devices. System memory 122 stores a Relational DataBase Management System (RDBMS) 130. The RDBMS 130 includes an optimizer 132 and other components 138. The optimizer 132 includes a query rewrite module 134 and a query optimization module 136. System memory 122 also stores one or more server applications 140. These computer programs that are stored in system memory 122 are executed by a processor (e.g., a Central Processing Unit (CPU)) (not shown). The server computer 120 provides the client computer 100 with access to data in a relational data store 170. In alternative embodiments, the computer programs may be implemented as hardware, software, or a combination of hardware and software.

The client computer 100 and server computer 120 may comprise any computing device known in the art, such as a server, mainframe, workstation, personal computer, hand held computer, laptop telephony device, network appliance, etc.

The network 190 may comprise any type of network, such as, for example, a Storage Area Network (SAN), a Local Area Network (LAN), Wide Area Network (WAN), the Internet, an Intranet, etc.

The relational data store 170 may comprise an array of storage devices, such as Direct Access Storage Devices (DASDs), Just a Bunch of Disks (JBOD), Redundant Array of Independent Disks (RAID), virtualization device, etc.

Embodiments of the invention enable evaluation of both correlated and decorrelated forms of a query, without requiring multiple rewrites of the query with the query rewrite module 134 and without multiple passes through the query optimization processing with the query optimization module 136.

Figure 2:
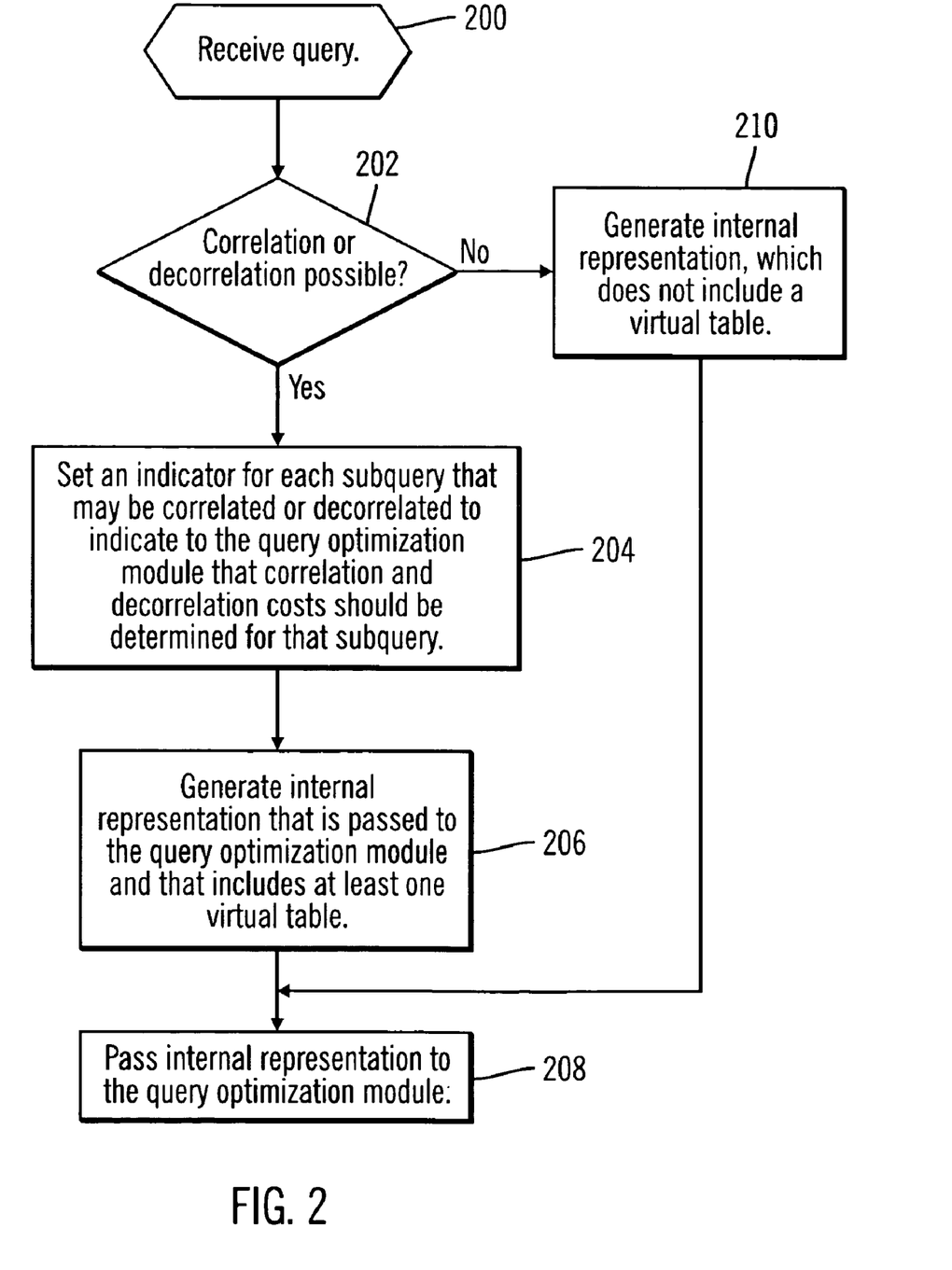
FIG. 2 illustrates logic performed by a query rewrite module in accordance with certain embodiments.

FIG. 2 illustrates logic performed by the query rewrite module 134 in accordance with certain embodiments. Control begins at block 200 with the query rewrite module 134 receiving a query. The query includes one or more subqueries, and each subquery may include one or more subqueries. In block 202, the query rewrite module 134 determines whether any subquery of the query may be correlated or decorrelated. If so, processing continues to block 204, otherwise processing continues to block 210.

Figure 3:
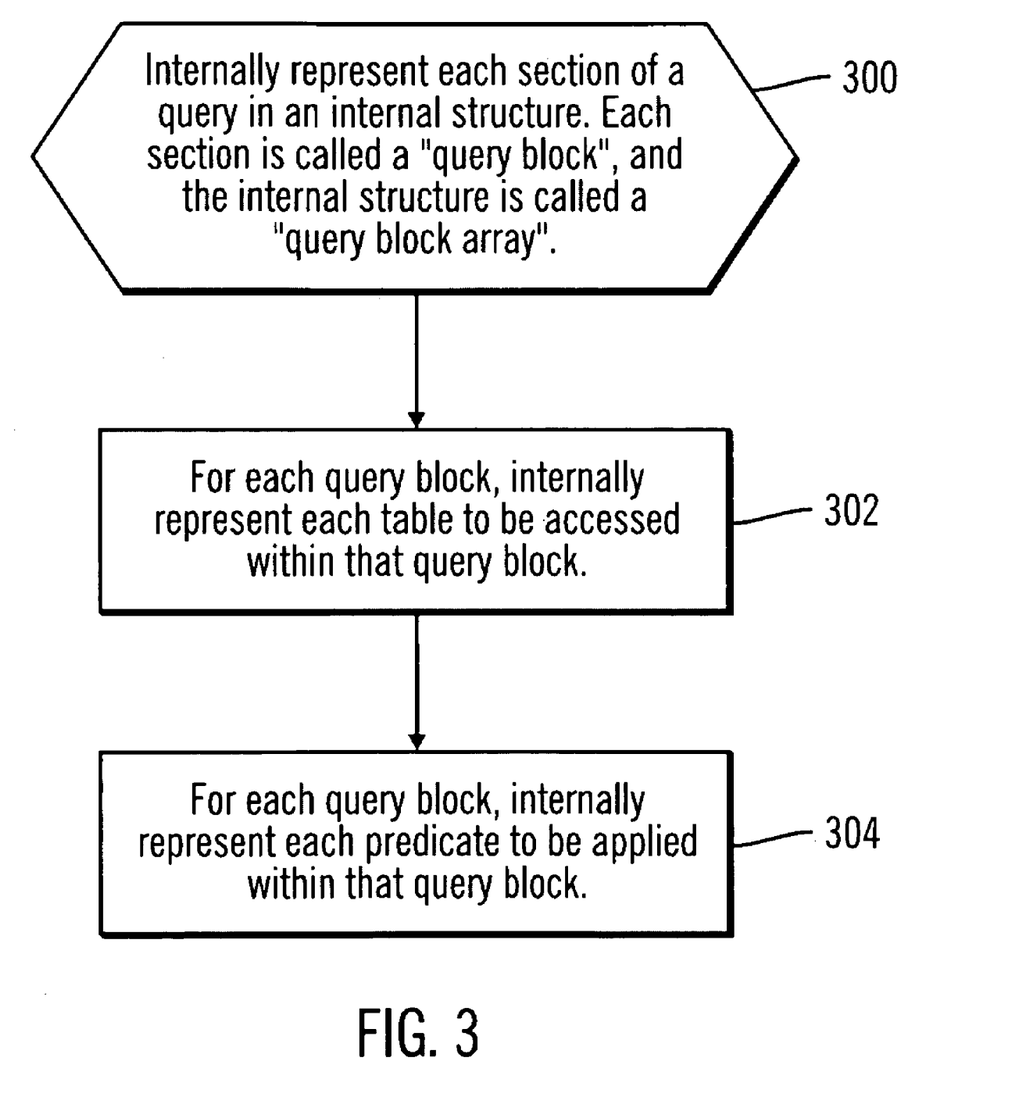
FIG. 3 illustrates logic performed by a query rewrite module to generate an internal representation of a query in accordance with certain embodiments.

In block 204, the query rewrite module 134 sets an indicator (e.g., a flag) for each subquery that may be correlated or decorrelated to indicate to the query optimization module 136 that both correlation and decorrelation costs should be determined for the subquery. The term "correlation costs" refers to costs of a correlated subquery, and the term "decorrelation costs" refers to costs of a decorrelated subquery. In block 206, the query rewrite module 134 generates an internal representation of the query, which is a hybrid query that is both correlated and decorrelated. FIG. 3 illustrates logic performed by the query rewrite module 134 to generate the internal representation in accordance with certain embodiments. Control begins in block 300 with the query rewrite module 134 internally representing each section of a query in an internal structure. Each section is called a "query block", and the internal structure is called a "query block array". In block 302, for each query block, the query rewrite module 134 internally represents each table to be accessed within that query block. In block 304, for each query block, the query rewrite module 134 internally represents each predicate to be applied within that query block.

In particular, a virtual table is generated for a subquery that may be correlated or decorrelated, and the virtual table is joined to an outer table of the query. The "outer table" is one that is used outside of the subquery and that may be correlated or decorrelated. An example query (4) is provided merely for illustration and is not intended to limit embodiments in any manner.

SELECT * FROM BIG_TABLE WHERE EXISTS (SELECT 1 (4) FROM SMALL_TABLE WHERE B.COL = A.COL)

The query is internally represented with 2 "query blocks". "Query block" 1 contains table BIG_TABLE and the EXISTS predicate. "Query block" 2 contains table SMALL_TABLE and "B.COL=A.COL" predicate. In block 206, a Virtual Table (VT) is added to "query block" 1. "Query block" 1 now contains 2 tables: BIG_TABLE and VT. Also, the EXISTS predicate in "query block" 1 is transformed to a join predicate between BIG_TABLE and VT).

The internal representation represents each subquery that may be correlated or decorrelated in both correlated and decorrelated forms simultaneously, which allows the query optimization module 136 to determine costs for both forms of each subquery, while determining an access path to be used. That is, during the query rewrite stage, the query rewrite module 134 rewrites the query to form the internal representation that the query optimization module 136 is able to process as both correlated and decorrelated. Thus, the query rewriting is performed once. In block 208, the query rewrite module 134 passes the internal representation to the query optimization module 136.

In block 210, the query rewrite module 134 generates an internal representation, which does not include a virtual table, and processing continues to block 208.

Figure 4:
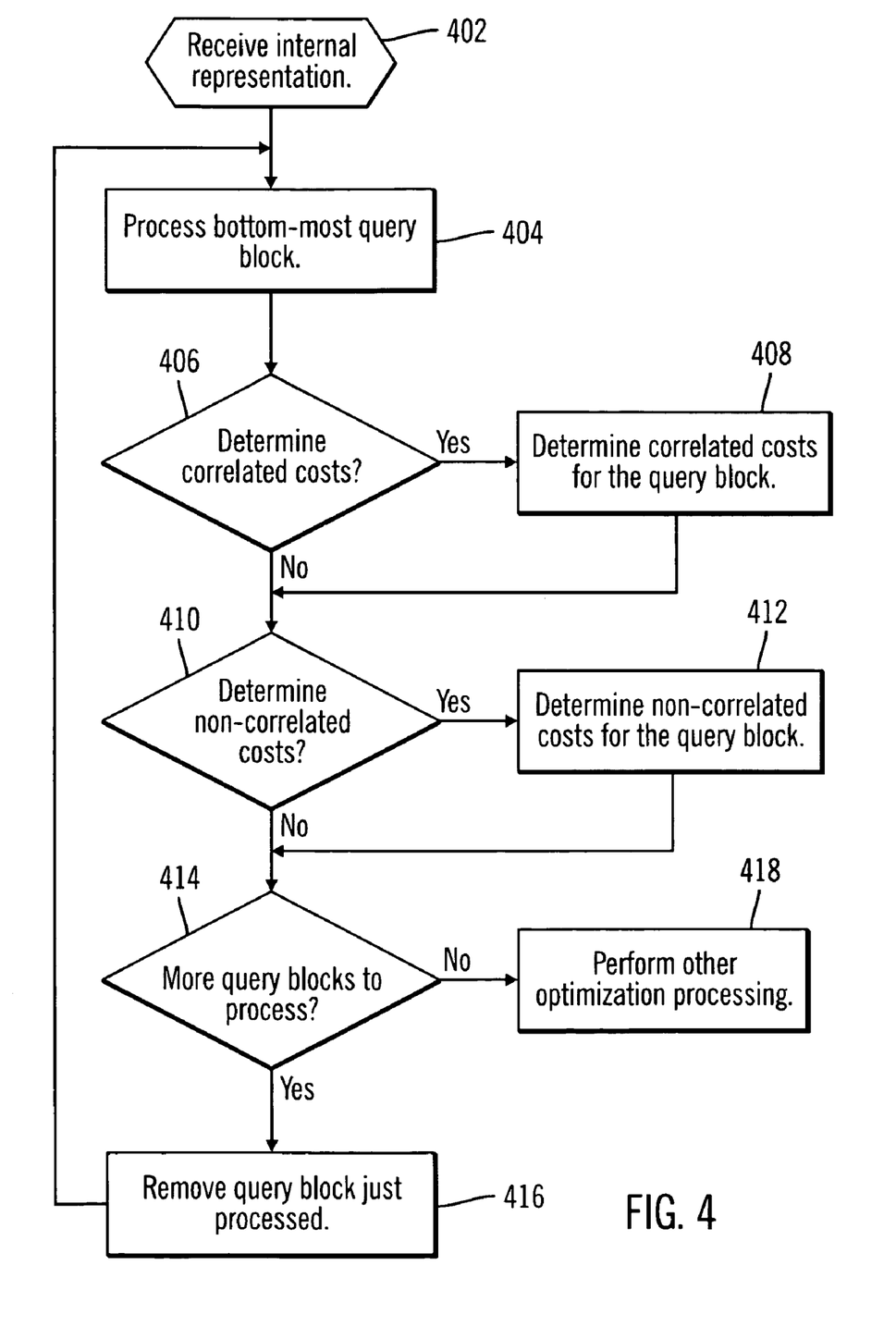
FIG. 4 illustrates logic performed by a query optimization module in accordance with certain embodiments.

FIG. 4 illustrates logic performed by the query optimization module 136 in accordance with certain embodiments. Control begins at block 402 with the query optimization module 136 receiving the internal representation of the query.

The internal representations includes at least one virtual table that is joined to an outer table. In block 404, the query optimization module 136 processes the bottom-most query block.

In block 406 the query optimization module 136 determines whether correlated costs are to be determined. In certain embodiments, the determination is made by determining whether indicators are set to indicate that correlation costs should be determined. If so, processing continues to block 408, otherwise, processing continues to block 410. In block 408, the query optimization module 136 determines correlated costs for the query block and processing continues to block 410.

In block 410, the query optimization module 136 determines whether non-correlated costs (i.e., decorrelation costs) are to be determined. In certain embodiments, the determination is made by determining whether indicators are set to indicate that decorrelation costs should be determined. If so, processing continues to block 412, otherwise, processing continues to block 414. In block 412, the query optimization module 136 determines non-correlated costs for the query block.

In block 414, the query optimization module 136 determines whether there are more query blocks to process. If so, processing continues to block 416, otherwise, processing continues to block 418. In block 416, the query optimization module 136 removes the query block that has just been processed and loops back to block 404 to process another query block. In block 418, the query optimization module 136 performs other optimization processing, such as selecting an access path associated with the form having a lowest cost.

Thus during the query optimization stage, the query optimization module 136 determines costs for the subquery in both the correlated and decorrelated forms. Although this increases the search space of competing access path choices, the query optimization module 136 is invoked once and calculates costs associated with each subquery of the query that may be correlated or decorrelated. Thus, unlike conventional techniques that invoke the query optimization stage multiple times, causing the entire query to be re-costed, embodiments provide a query optimization module 136 that is able to determine the cost of just the parts associated with a subquery that may be correlated or decorrelated.

When the cost for the correlated form is determined, the correlated predicate is eligible. When the cost for the decorrelated form is determined, the correlated predicate is not eligible. The resulting costs and access path choices are saved and used when calculating the cost of a join between the outer table and a virtual table.

When calculating the cost of joining the outer table and the virtual table, the query optimization module 136 evaluates two different join sequences (normal join enumeration). When calculating the cost of the virtual table join to outer table, the decorrelated form of the virtual table is considered because that form allows the virtual table to be accessed before outer table. The saved decorrelated costs and access path choices for the virtual table are retrieved and used to calculate the cost of the join sequence. When calculating the cost of the outer table join to virtual table, both the correlated and non-correlated forms of the virtual table are considered. The saved costs and access path choices for the virtual table form under consideration are retrieved and used to calculate the cost of the join.

The resulting choices are: virtual table (in decorrelated form) join to outer table, outer table join to virtual table (in correlated form), and outer table join to virtual table (in decorrelated form). Thus, when the query optimization module 136 selects an access path based on the determined costs, the query optimization module 136 selects the resulting join with the lowest cost.

Thus embodiments avoid the extra overhead in the query rewrite stage and the query optimization stage by invoking these stages once and performing a minimal set of transformations and costing needed to expand the access path search space to cover the desired forms of the query.

To provide a better understanding of the invention, an example will be provided. Embodiments are not intended to be limited to the example. During the query rewrite stage, when a subquery is encountered, the query rewrite module 134 evaluates the subquery to determine whether the subquery can be correlated or decorrelated. In certain embodiments, the subquery may be correlated or decorrelated if the correlation is part of an equal ("=") condition. If the subquery can be correlated or decorrelated, the query rewrite module 134 marks the subquery as such (e.g., by setting flags) and represents the subquery in the FROM clause that corresponds to the WHERE clause containing the subquery. Query (5) is an example query:

SELECT * FROM T1 WHERE  (5)
    EXISTS (SELECT 1 FROM T2 WHERE T2.C1 = T1.C1)

If the query rewrite module 134 determines that the subquery in query (5) may be decorrelated based on semantic rules, then the query rewrite module 134 represents the subquery in the FROM clause containing T1. This allows the query optimization module 136 to recognize this as a special type of join between T1 and the subquery. In addition, the query rewrite module 134 generates a join predicate between an object representing T1 and an object representing the subquery.

The internal representation of the subquery may be referred to as a Virtual Table (VT). Query (6) is a sample internal representation of query (5):

SELECT T1.* FROM T1, VT WHERE T1.C1=VT.C1  (6)

For query (6), VT is defined as (SELECT T2.C1 FROM T2 WHERE T2.C1=T1.C1).

The query rewrite module 134 has now transformed query (5) into query (6), which is a hybrid query that is both correlated and decorrelated. Query (6) is correlated because the correlated predicate is contained in the subquery. Query (6) is decorrelated because of the join predicate between T1 and VT.

The query optimization module 136 recognizes that query (6) has two forms, correlated and decorrelated. The query optimization module 136 determines costs for query (6) for both the correlated and the decorrelated forms.

When the cost for the correlated form is determined, the correlated predicate is eligible. When the cost for the decorrelated form is determined, the correlated predicate is not eligible. The resulting costs and access path choices are saved and used when calculating the cost of the join between T1 and VT.

When calculating the cost of joining T1 and VT, the query optimization module 136 evaluates two different join sequences (normal join enumeration). When calculating the cost of the VT join to T1, the decorrelated form of the VT is considered because that form allows the VT to be accessed before T1. The saved decorrelated costs and access path choices for the VT are retrieved and used to calculate the cost of the join sequence. When calculating the cost of the T1 join to VT, both the correlated and non-correlated forms of the VT are considered. The saved costs and access path choices for the VT form under consideration are retrieved and used to calculate the cost of the join.

The resulting choices are: VT (decorrelated) join to T1, T1 join to VT (correlated), and T1 join to VT (decorrelated). The query optimization module 136 selects the choice with the lowest cost. This allows an efficient access path to be obtained while minimizing the amount of optimization processing involved in obtaining that access path.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain embodiments may be directed to a method for deploying computing infrastructure by a person or automated processing integrating computer-readable code into a computing system, wherein the code in combination with the computing system is enabled to perform the operations of the described embodiments.

The term logic may include, by way of example, software or hardware and/or combinations of software and hardware.

The logic of FIGS. 2, 3, and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, and 4 may be implemented in software, hardware, programmable and non-programmable gate array logic or in some combination of hardware, software, or gate array logic.

Figure 5:
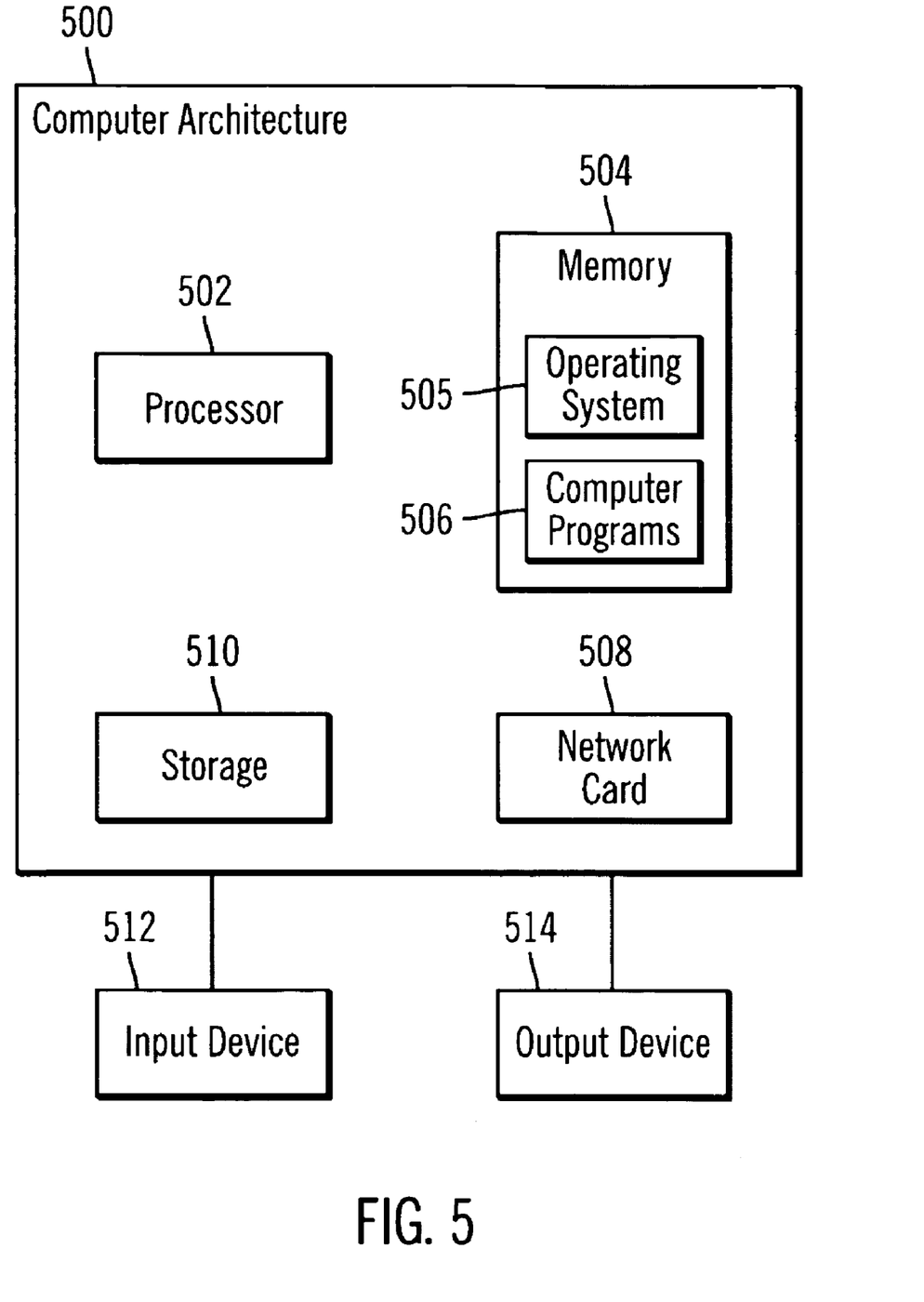
FIG. 5 illustrates an architecture of a computer system that may be used in accordance with certain embodiments.

FIG. 5 illustrates an architecture 500 of a computer system that may be used in accordance with certain embodiments. Client computer 100, server computer 120, and/or operator console 180 may implement architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. An article of manufacture for processing a query, wherein the article of manufacture comprises a computer readable storage medium storing instructions, and wherein the article of manufacture is operable to:

determine that the query includes at least one subquery that is to be correlated or decorrelated; and generate an internal representation of the query that represents the subquery in both correlated and decorrelated form, wherein the internal representation includes at least one virtual table, and the query includes an outer table, and wherein the internal representation represents the query using one or more query blocks and further comprising:

selecting a bottom-most query block;

determining correlated costs of the query block in response to determining that correlated costs are to be determined; and determining non-correlated costs of the query block in response to determining that non-correlated costs are to be determined, wherein the article of manufacture is operable to:

join the virtual table in decorrelated form to the outer table; and join the outer table to the virtual table in decorrelated form.

2. The article of manufacture of claim 1, wherein the article of manufacture is operable to:

determine correlated costs for the subquery in correlated form; and determine non-correlated costs for the subquery in decorrelated form.

3. The article of manufacture of claim 2, wherein the article of manufacture is operable to:

select an access path associated with a form having a lowest cost.

4. The article of manufacture of claim 1, wherein the article of manufacture is operable to:

set an indicator to indicate that at least one of correlated or non-correlated costs are to be determined.

5. The article of manufacture of claim 1, wherein the article of manufacture is operable to:

internally represent each section of the query in an internal structure, wherein each section comprises a query block and wherein the internal structure comprises a query block array.

6. The article of manufacture of claim 5, wherein the article of manufacture is operable to:

for each query block, internally represent each table to be accessed within that query block; and for each query block, internally represent each predicate to be applied within that query block.

7. The article of manufacture of claim 1, wherein the internal representation includes a join of the virtual table and the outer table.

8. The article of manufacture of claim 7, wherein the article of manufacture is operable to:

join the outer table to the virtual table in correlated form.

9. A system including a processor for processing a query, comprising:

hardware logic causing operations to be performed, the operations comprising:

determining that the query includes at least one subquery that is to be correlated or decorrelated; and generating an internal representation of the query that represents the subquery in both correlated and decorrelated form, wherein the internal representation includes at least one virtual table, and the query includes an outer table, and wherein the internal representation represents the query using one or more query blocks and further comprising:

selecting a bottom-most query block;

determining correlated costs of the query block in response to determining that correlated costs are to be determined; and determining non-correlated costs of the query block in response to determining that non-correlated costs are to be determined, wherein the operations for determining non-correlated costs further comprise:

joining the virtual table in decorrelated form to the outer table; and joining the outer table to the virtual table in decorrelated form.

10. The system of claim 9, wherein the operations further comprise:

determining correlated costs for the subquery in correlated form; and determining non-correlated costs for the subquery in decorrelated form.

11. The system of claim 10, wherein the operations further comprise:

selecting an access path associated with a form having a lowest cost.

12. The system of claim 9, wherein the operations further comprise:

setting an indicator to indicate that at least one of correlated or non-correlated costs are to be determined.

13. The system of claim 9, wherein the operations for generating the internal representation further comprise:

internally representing each section of the query in an internal structure, wherein each section comprises a query block and wherein the internal structure comprises a query block array.

14. The system of claim 13, wherein the operations further comprise:

for each query block, internally representing each table to be accessed within that query block; and for each query block, internally representing each predicate to be applied within that query block.

15. The system of claim 9, wherein the internal representation includes a join of the virtual table and the outer table.

16. The system of claim 15, wherein the operations for determining correlated costs further comprise:

joining the outer table to the virtual table in correlated form.

* * * * *